(12) United States Patent
Mohanty et al.

(10) Patent No.: US 12,098,277 B2
(45) Date of Patent: Sep. 24, 2024

(54) ENGINEERING PLASTIC COMPOSITES WITH HIGH SUSTAINABLE CONTENT

(71) Applicant: UNIVERSITY OF GUELPH, Guelph (CA)

(72) Inventors: Amar Kumar Mohanty, Guelph (CA); Manjusri Misra, Guelph (CA); Dylan Jubinville, Guelph (CA); Boon Peng Chang, Guelph (CA); Andrew Anstey, Guelph (CA); Amandine Marie Floriane Magali-Sophie Codou, Guelph (CA); Mohamed Ahmed Mohamed Abdelwahab, Guelph (CA); Michael Ryan Snowdon, Owen Sound (CA)

(73) Assignee: UNIVERSITY OF GUELPH, Guelph (CA)

( * ) Notice: Subject to any disclaimer, the term of this patent is extended or adjusted under 35 U.S.C. 154(b) by 650 days.

(21) Appl. No.: 17/261,847

(22) PCT Filed: Jul. 19, 2019

(86) PCT No.: PCT/CA2019/051001
§ 371 (c)(1),
(2) Date: Jan. 20, 2021

(87) PCT Pub. No.: WO2020/014792
PCT Pub. Date: Jan. 23, 2020

(65) Prior Publication Data
US 2021/0261774 A1    Aug. 26, 2021

Related U.S. Application Data

(60) Provisional application No. 62/701,132, filed on Jul. 20, 2018.

(51) Int. Cl.
| | |
|---|---|
| *C08K 3/04* | (2006.01) |
| *C08K 3/34* | (2006.01) |
| *C08K 7/06* | (2006.01) |
| *C08L 23/26* | (2006.01) |
| *C08L 67/02* | (2006.01) |
| *C08L 77/02* | (2006.01) |

(52) U.S. Cl.
CPC .............. *C08L 77/02* (2013.01); *C08K 3/04* (2013.01); *C08K 3/346* (2013.01); *C08K 7/06* (2013.01); *C08K 2201/011* (2013.01); *C08L 23/26* (2013.01); *C08L 67/02* (2013.01); *C08L 2205/03* (2013.01); *C08L 2205/08* (2013.01); *C08L 2207/20* (2013.01)

(58) Field of Classification Search
CPC .... C08K 2201/011; C08K 3/04; C08K 3/346; C08L 2205/03; C08L 2205/08; C08L 2207/20; C08L 23/26; C08L 67/02; C08L 77/02; C08L 77/06; C08L 97/005; C08L 97/02; C08L 99/00; C08L 23/147
See application file for complete search history.

(56) References Cited

U.S. PATENT DOCUMENTS

| | | |
|---|---|---|
| 8,541,001 B2 | 9/2013 | Netravali et al. |
| 8,877,338 B2 | 11/2014 | Dorgan et al. |
| 9,809,702 B2 | 11/2017 | Mohanty et al. |
| 2018/0022921 A1 | 1/2018 | Mohanty et al. |

FOREIGN PATENT DOCUMENTS

| | | |
|---|---|---|
| CN | 18877959 A * | 1/2007 |
| CN | 103073853 | 5/2013 |
| CN | 103087515 | 5/2013 |
| CN | 104693606 | 6/2015 |
| CN | 105086328 | 11/2015 |

OTHER PUBLICATIONS

CN 18877959 A machine translation (Jan. 2007).*
Cieślak, M., Schmidt, H., "Possibilities of utilising textile floor covering wastes", Apr. 2002 Fibres and Textiles in Eastern Europe 10(2):69-73.
Myllytie, P., et al., Carbonized Lignin as Sustainable Filler in Biobased Poly(trimethylene terephthalate) Polymer for Injection Molding Applications, ACS Sustainable Chem. Eng. 2016, 4, 1, 102-110, Dec. 16, 2015.
Han, M.S., et al., Reactive blends of poly(butylene terephthalate)/polyamide-6 with ethylene glycidyl methacrylate, Korea-Australia Rheology Journal, vol. 13, No. 4, Dec. 2001 pp. 169-177.
Ogunsona, E., et al., Thermally Stable Pyrolytic Biocarbon as an Effective and Sustainable Reinforcing Filler for Polyamide Biocomposites Fabrication, Journal of Polymers and the Environment 26(9), pp. 3574-3589, Apr. 27, 2018.
Written Opinion of the International Searching Authority, PCT/CA2019/051001, WO2020014792, Jan. 23, 2020.
Wu, T.-M.; Liao, C.-S., Polymorphism in nylon 6/clay nanocomposites. Macromolecular Chemistry and Physics 2000, 2001 (18), 2820-2825.
Liu, L.; Qi, Z.; Zhu, X., Studies on nylon 6/clay nanocomposites by melt-intercalation process. Journal of Applied Polymer Science 1999, 71 (7), 1133-1138.
Chavarria, F.; Paul, D. R., Comparison of nanocomposites based on nylon 6 and nylon 66. Polymer 2004, 45 (25), 8501-8515.
Fomes, T. D.; Paul, D. R., Crystallization behavior of nylon 6 nanocomposites. Polymer 2003, 44 (14), 3945-3961.
Fomes, T. D.; Yoon, P. J.; Keskkula, FL; Paul, D. R., Nylon 6 nanocomposites: the effect of matrix molecular weight. Polymer 2001, 42 (25), 09929-09940. 7. Cho, J. W.; Paul, D. R., Nylon 6 nanocomposites by melt compounding. Polymer 2001, 42 (3), 1083-1094.
Gao, F., Clay/polymer composites: the story. Materials Today 2004, 7 (11), 50-55.

(Continued)

*Primary Examiner* — Ana L. Woodward
(74) *Attorney, Agent, or Firm* — Eduardo Krupnik

(57) ABSTRACT

A biocomposite formulation comprising a polyamide, an engineering polyester and biocarbon. The biocomposite can be reinforced with various additives, including reactive compatibilizers, bio-sourced carbons, nanofillers and recycled carbon fibers.

13 Claims, No Drawings

(56) References Cited

OTHER PUBLICATIONS

Auto applications drive commercialization of nanocomposites. Plastics, Additives and Compounding 2002, 4 (1), 30-33.

Behazin, E.; Ogunsona, E.; Rodriguez-Uribe, A.; Mohanty, A. K.; Misra, M.; Anyia, A. O., Mechanical, Chemical, and Physical Properties of Wood and Perennial Grass Biochars for Possible Composite Application. Bioresources 2015, 11 (1).

Behazin, E.; Misra, M.; Mohanty, A. K., Sustainable biocarbon from pyrolyzed perennial grasses and their effects on impact modified polypropylene biocomposites. Composites Part B: Engineering 2017, 118, 116-124.

Behazin, E.; Misra, M.; Mohanty, A. K., Sustainable biocomposites from pyrolyzed grass and toughened polypropylene: Structure-property relationships. ACS Omega 2017, 2 (5), 2191-2199.

Wang, T.; Rodriguez-Uribe, A.; Misra, M.; Mohanty, A. K., Sustainable carbonaceous biofiller from miscanthus: size reduction, characterization, and potential biocomposites applications. BioResources 2018, 13 (2), 3720-3739.

Codou, A.; Misra, M.; Mohanty, A. K., Sustainable biocarbon reinforced nylon 6/polypropylene compatibilized blends: Effect of particle size and morphology on performance of the biocomposites. Composites Part A: Applied Science and Manufacturing 2018, 112, 1-10.

Ogunsona, E. O.; Misra, M.; Mohanty, A. K., Impact of interfacial adhesion on the microstructure and property variations of biocarbons reinforced nylon 6 biocomposites. Composites Part A: Applied Science and Manufacturing 2017, 98, 32-44.

Ogunsona, E. O.; Misra, M.; Mohanty, A. K., Sustainable biocomposites from biobased polyamide 6, 10 and biocarbon from pyrolyzed miscanthus fibers. Journal of Applied Polymer Science 2017, 134 (4).

Ogunsona, E. O.; Misra, M.; Mohanty, A. K., Influence of epoxidized natural rubber on the phase structure and toughening behavior of biocarbon reinforced nylon 6 biocomposites. RSC Advances 2017, 7 (15), 8727-8739.

Jubinville, D.; Chang, B. P.; Pin, J.-M.; Mohanty, A. K.; Misra, M., Synergistic thermo-oxidative maleation of PA11 as compatibilization strategy for PA6 and PBT blend. Polymer 2019, 179, 121594.

Wakita, N., Melt elasticity of incompatible blends of poly(butylene terephthalate)(PBT) and polyamide 6 (PA6). Polymer Engineering & Science 1993, 33 (13), 781-788.

Han, M. S.; Lim, B. H.; Jung, H. C.; Hyun, J. C.; Kim, S. R.; Kim, W. N., Reactive blends of poly(butylene terephthalate)/polyamide-6 with ethylene glycidyl methacrylate. Korea-Aust. Rheol. J. 2001, 13 (4), 169-177.

Lievana, E.; Karger-Kocsis, J., Impact modification of PA-6 and PBT by epoxy-functionalized rubbers. Macromolecular Symposia 2003, 202 (1), 59-66.

Chiou, K.-C.; Chang, F.-C., Reactive compatibilization of polyamide-6 (PA 6)/polybutylene terephthalate (PBT) blends by a multifunctional epoxy resin. Journal of Polymer Science Part B: Polymer Physics 2000, 38 (1), 23-33.

Kim, S.-J.; Kim, D.-K.; Cho, W.-J.; Ha, C.-S., Morphology and properties of PBT/nylon 6/EVA-g-MAH ternary blends prepared by reactive extrusion. Polymer Engineering & Science 2003, 43 (6), 1298-1311.

\* cited by examiner

ENGINEERING PLASTIC COMPOSITES WITH HIGH SUSTAINABLE CONTENT

CROSS REFERENCE TO RELATED APPLICATIONS

This application is a national stage application under 35 U.S.C. § 371 of International Application No. PCT/CA2019/051001, filed Jul. 19, 2019, which in turn claims the benefit under 35 U.S.C. § 119(e) of U.S. Provisional Ser. No. 62/701,132, filed Jul. 20, 2018, the contents of each of which are hereby incorporated by reference into the present disclosure.

1. FIELD OF THE INVENTION

The present invention relates to engineering plastic blends and composites. More particularly, the present invention relates to hybrid carbonaceous biocomposites, and more particularly to polyamide (PA) and engineering polyester-based carbonaceous biocomposite blends with high sustainable and recycled content, enhanced dimensional stability and durability for high performance applications, particularly those requiring high tolerances for injection moulding.

2. BACKGROUND OF INVENTION

Polyamides (PAS), commonly known as nylons, are a well-established class of engineering thermoplastic, which are widely used in many industrial applications, including the automotive sector. Nylons such as PA6 and PA6,6 are especially desirable materials for automotive use due to their excellent strength, stiffness, thermal stability, and resistance to chemicals and abrasion. A common practice in industry for modifying the properties of nylons is their blending with other thermoplastics (such as polyethylene, polypropylene, and polystyrene) and elastomers.

When combined with reinforcing fillers such as glass fibers and minerals (ie; talc, kaolin, wollastonite), nylon composite resins can be produced with exceptional stiffness, while maintaining processability in injection moulding applications. This has facilitated the replacement of steel and aluminum automotive parts with nylon composite resins, which has allowed weight savings due to the lower density and higher specific strength of the material. These resins have been especially effective in "under-the-hood" applications due to their excellent durability and heat resistance. Chinese Patent CN103087515B discloses a high-content glass fiber reinforced PA6 composite material and preparation method thereof. The designed PA6 composite prepared according to the stated invention has excellent performance, particularly having good mechanical properties.

The reinforcement of PA resins with clay particles has been a heavily researched area in the last 20 years. Of particular interest is the development of organically modified clays, or organoclays, which can be exfoliated in situ during extrusion with PAs. The exfoliation separates the individual clay platelets, yielding a nanoscale dispersed reinforcement with a high aspect ratio. The achievement of PA-organoclay nanocomposites has led to drastically improved properties at a low filler loading (less than 5%), including the tensile strength, modulus, heat deflection temperature (HDT) and coefficient of linear thermal expansion (CLTE). A substantial amount of research effort by various academic and industrial projects has investigated the mechanical, thermomechanical, rheological, and tribological properties of nylon-clay nanocomposites.[1-7] The suitability of these nanocomposites for automotive components has driven their development and application in this industry.[8,9]

Biosourced carbon (biocarbon) has seen recent development as a carbonaceous reinforcing filler for engineering thermoplastics. Due to its high temperature stability, it is compatible for extrusion at elevated temperatures, while also being completely bio-based. Because biocarbon can be a carbon sink and is produced from a variety of organic materials, it is an ideal low-cost filler with reduced environmental impact compared to existing fillers such as talc and glass fiber. Recent studies of biocarbon composites have shown that it can successfully reinforce a variety of polymers, while also providing reduced weight compared to mineral-filled composites without compromising performance.[10-15] Ogunsona et al. have conducted research specific to PA-biocarbon biocomposites, which have demonstrated that biocarbon (at loadings of 20-30 wt. %) can successfully improve the tensile strength, stiffness, and HDT of PA6, while maintaining good processability in injection moulding equipment.[16-18] High performance biobased PA6-polypropylene blends and their biocomposites [US20180022921] have been reported by Mohanty et al. The nylon-based biocomposites possess decent performance and at the same time are light weight.

One of the remaining challenges in commercializing this biocomposites is controlling its CLTE. This aspect is critical in order to ensure the proper dimensional tolerances are achieved in the injection moulds used within industry and to predict the degree of post-moulding shrinkage.

Biobased composites (biocomposites) usually have little resistance to environmental degradation when compared to synthetic fibers due to their natural constituent portion in the system. Therefore, the improvement of the durability and lifetime of the biocomposites under severe environmental conditions remains a challenge yet to be solved. A further challenge is controlling the thermal degradation of the material during prolonged exposure to elevated temperatures-polyamides are well known to be susceptible to both oxidative and hydrolytic aging processes. The blending of polyamide with thermally stable engineering thermoplastics might boost its durability performance. These composite resins possess high degrees of tensile and flexural strength/stiffness, impact resistance, and are resistance to thermal aging effects.

Polybutylene terephthalate (PBT) is another essential high-volume engineering thermoplastic belonging to the same polyester family as polyethylene terephthalate (PET). PBT is highly used in many industrial applications ranging from household components to automotive parts due to its excellent properties. In particular, unreinforced and reinforced PBT are heavily used as automotive components due to its high mechanical strength, dimensional stability, high heat distortion temperature, durability, etc. These outstanding properties make PBT one of the blend candidates by researchers with many polymers to improve performance. This includes blending PBT with PET, polystyrene (PS), PA6,6, PP, polycarbonate (PC), polyether imide (PEI) and others. Our recent published works showed that the blending of PA6 and PBT showed exceptional mechanical performance. The mechanical strength is higher than their neat polymer after blending at 90/10 and 80/20 PA6/PBT composition. The amide-ester reactions might occur during the reactive extrusions of the blends, which can yield good benefits to the PA6-based blends and composites performance.

Chinese patent CN103073853B describes an environmentally friendly flame retardant reinforced PBT/PET/PA6 alloy and preparation method. The alloy is composed of PBT, PET, PA6, toughening compatibilizer compound type, flame retardant synergists, glass fibers, antioxidants and lubricating dispersion agent.

PA6 and polyesters like PET and PBT are immiscible in nature when blending.[19, 20] Compatibilization of the blends with reactive chemical compound are necessary to improve the blends' interactions and performance. Han et al.[21] compatibilized PA6 and PBT with an appropriate amount of ethylene glycidyl methacrylate and they reported significant improvement in the tensile strength after compatibilization. Other published works on the compatibilization of PA6 and PBT have been reported with different grafting approaches such as using ethylene-vinyl acetate grafted maleic anhydride (EVA-g-MA), PA11-g-MA[19] etc.

The use of sustainable materials and utilization of waste/recycled products in many commercial products has increased tremendously due to the environmental concern globally. The use of these sustainable materials helps in addressing global concern such as environmental pollution, global warming as well as climate change. A number of patent documents have been filed and reported to develop sustainable biocomposites with natural materials from plant fiber, biochar, cellulose, bacteria nanocellulose etc. i.e. U.S. Pat. No. 9,809,702B2, U.S. Pat. No. 8,877,338B2, CN105086328B, CN104693606B, U.S. Pat. No. 8,541, 001B2. Innovative sustainable resources such as biosourced materials, as well as wastes, coproducts, and recycled materials, can be used as both the matrix and reinforcement in composites to minimize the use of non-renewable resources and to make better use of waste streams. Recycled water bottle (a.k.a. recycled PET) and recycled carpet (a.k.a. recycled nylon) from the wastes are two sustainable alternatives to new petroleum sourced plastics. The proper utilization of recycled materials can reduce humans needs on heavily relying on the finite petrol-sourced resources.

Carpet waste is one of the largest postconsumer wastes in the world. Due to the complex composition and additives present in floor carpet, the carpet wastes are not suitable for direct reuse in textile processing.[22] Carpet wastes could be potentially used for polymer blends or composites reinforcement after being properly ground and processed.

From the food packaging sector, a significant amount of PET ends up in the recycling stream, with PET being one of the most widely recycled plastics. This recycled PET (rPET) has found many uses in reprocessed areas from fiberfill, to fabric, to automotive parts, to industrial strapping, sheet and film, and new containers for both food and non-food products. However, rPET tends to undergo hydrolysis when it is reprocessed, which decreases its average molecular weight (MW). Other factors during PET's recycling can also contribute to MW loss, such as thermal exposure and shear degradation. The rPET plastic then available for product manufacturing has reduced mechanical properties, impact resistance, and melt viscosity. This shrinks its useful scope compared to virgin PET.

3. SUMMARY OF INVENTION

The present invention provides a reinforced polyamide-based resin with high sustainable content, including recycled content and biobased additive, which also demonstrates thermal stability during extrusion processing, and a degree of dimensional stability that is suitable for injection moulding applications demanded by industry.

In one embodiment, the present invention is a biocomposite formulation comprising a polyamide, an engineering polyester and biocarbon.

In one embodiment of the biocomposite formulation of the present invention, the engineering polyester is polytrimethylene terephthalate (PTT), poly(ethylene terephthalate) (PET), polybutylene terephthalate (PBT) or any combination thereof.

In another embodiment of the biocomposite formulation of the present invention, the polyamide is PA6, PA6,6 or a combination thereof.

In another embodiment of the biocomposite formulation of the present invention, the biocomposite formulation further comprises a recycled polymer.

In another embodiment of the biocomposite formulation of the present invention, the biocomposite formulation comprises at least 20 wt. % of the polyamide, at least 10 wt. % of the recycled polymer, at least 10 wt. % of the engineering polyester and at least 15 wt. % of the biocarbon.

In another embodiment of the biocomposite formulation of the present invention, the recycled polymer is a recycled polyamide, a recycled engineering polyester, or a combination of a recycled polyamide and a recycled engineering polyester.

In another embodiment of the biocomposite formulation of the present invention, the biocomposite formulation comprises at least 20 wt. % of the polyamide, at least 10 wt. % of the recycled polyamide, at least 10 wt. % of the recycled engineering polyester and at least 15 wt. % of the biocarbon.

In another embodiment of the biocomposite formulation of the present invention, the biocomposite formulation further comprises a nanofiller. In aspects of the invention, the biocomposite formulation comprises up to 3 wt. % of the nanofiller In another embodiment of the biocomposite formulation of the present invention, the nanofiller is nanoclay.

In another embodiment of the biocomposite formulation of the present invention, the biocomposite formulation further comprises maleated polypropylene (MAPP) or maleated polyethylene (MAPE) compatibilizer.

In another embodiment of the biocomposite formulation of the present invention, the biocomposite formulation further comprises acrylate ethylene terpolymer (EBA-GMA).

In another embodiment of the biocomposite formulation of the present invention, the biocmposite formulation further comprises 1 to 3 wt. % of MAPP and/or MAPE, 1 to 2 wt. % MAPE, 1 to 2 wt. % SMA and 3 to 6 wt. % EBA GMA compatibilizers.

In another embodiment of the biocomposite formulation of the present invention, the biocomposite formulation further comprises recycled carbon fiber.

In another embodiment of the biocomposite formulation of the present invention, the biocomposite formulation further comprises pultruded long carbon fiber master batch.

In another embodiment of the biocomposite formulation of the present invention, the biocomposite formulation further comprises PLA.

In another embodiment of the biocomposite formulation of the present invention, the biocomposite formulation has a notched impact strength equal to or more than 60 J/m;

In another embodiment of the biocomposite formulation of the present invention, the biocomposite formulation has tensile strength equal to or more than 100 MPa and a tensile modulus equal or more than 9000 MPa.

In another embodiment of the biocomposite formulation of the present invention, the biocomposite formulation has a density equal to or more than 1.26 g/cm3.

In another embodiment of the biocomposite formulation of the present invention, the recycled polymer content is at least 20% of the total mass of the biocomposite.

In another embodiment of the biocomposite formulation of the present invention, the recycled polymer and biocarbon content is at least 50% of the total mass of the biocomposite.

In another embodiment of the biocomposite formulation of the present invention, the biocarbon is a hybrid biocarbon comprising two or more different biomass sources.

In another embodiment of the biocomposite formulation of the present invention, the biocarbon is a hybrid biocarbon comprising a mixture of biomass sources of different temperatures of pyrolysis.

4. DETAILED DESCRIPTION OF THE INVENTION

4.1 Definitions

The following definitions, unless otherwise stated, apply to all aspects and embodiments of the present application. Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "include without limitation"). Singular forms included in the claims such as "a", "an" and "the" include the plural reference unless expressly stated otherwise. All relevant reference, including patents, patent applications, government publications, government regulations, and academic literature are hereinafter detailed and incorporated by reference in their entireties.

All numerical designations, including ranges, are approximations which are varied (+) or (−) by increments of 1.0 or 0.1, as appropriate, or alternatively by a variation of +/−15%, or alternatively 10%, or alternatively 5% or alternatively 2%. It is to be understood, although not always explicitly stated, that all numerical designations are preceded by the term "about". It also is to be understood, although not always explicitly stated, that the reagents described herein are merely exemplary and that equivalents of such are known in the art.

As used herein, the term "substantially" includes exactly the term it modifies and slight variations therefrom.

The term "plurality," as used herein, is defined as two or more than two. The term "another," as used herein, is defined as at least a second or more. The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "substantially" includes exactly the term it modifies and slight variations therefrom.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab and the variation inherent in the analytical method. Whether or not modified by about, the amounts include equivalents to those amounts. Any quantity stated herein and modified by "about" can also be employed in the present invention as the amount not modified by about.

Non-limiting examples of "engineering polyester" include polytrimethylene terephthalate (PTT), poly(ethylene terephthalate) (PET) and polybutylene terephthalate (PBT).

"Biocarbon" refers to the solid carbonaceous material, also referred to as charcoal or biochar, obtained through pyrolysis of biomass that contains plant fiber (including miscanthus, wood chips, corn cob, soy hulls, peanuts hulls and chicken feather, etc.) at the pyrolyzing temperatures between 350 to 900° C., in the absence or near absence of oxygen.

The prefix "bio-" is used in this document to designate a material that has been derived from a renewable resource.

"Master batch", as used herein, refers to a mixture or blend of filler (e.g. biocarbon, carbon fiber) and plastic, typically prepared by extrusion, which is added to a plastic to form the final composite. The master batch can be used to control the dosage and dispersion when added in the desired ratio during extrusion or injection molding of the final composite materials. The master batch may contain one or more additives, such as lubricants.

"CLTE" refers to coefficient of linear thermal expansion, a measure of the degree of expansion of a material for a measured change in temperature.

"HDT" refers to heat deflection temperature (or heat distortion temperature), a measure of the temperature at which a material deforms under a specified load.

"Composite" refers to any polymer matrix which is reinforced with a dispersed filler material.

"Biocomposite" refers to a composite in which some fraction of the material, either the polymer or filler, is bio-based or/and recycled plastics or recycled carbon fibers.

"Nanocomposite" refers to any composite material in which a dispersed phase with at least one dimension on the nanometer scale is present (e.g. Nano clay).

The term "wt. %" refers to the weight percent of a component in the composite formulation with respect to the weight of the whole composite formulation.

The term "phr" refers to the parts per hundred of a component in the composite formulation with respect to the part of the whole composite formulation.

4.2 Overview

The present invention relates to engineering plastic composites with high sustainable content. The source of the sustainable content include biobased content, recycled content and waste content.

Plastic composites are generally hindered when incorporating multiple sustainable materials as those mentioned. The present invention addresses the shortcomings of the prior art by enhancing nylon-biocarbon blends with nano-fillers, creating nanocomposites with enhanced dimensional stability, stiffness, and thermal stability (HDT). Biocarbon is a sustainable, bio-based material which has proven to be a lightweight, thermally stable reinforcing filler for polyamide-based composites. By enhancing the blend with nano-clay, a hybrid reinforcement system is created which provides excellent mechanical properties while only requiring a small fraction of clay, and maintaining a high degree of bio-based content. These nanocomposites have improved thermal and dimensional stability, as well as enhanced tensile and flexural properties.

The tensile and flexural properties are further improved by the addition of recycled chopped carbon fiber. The use of post-industrial recycled short fibers provides a cost effective and more sustainable solution to dramatically increase the tensile and flexural strength/modulus of the resins. The recycled carbon fibers can be added in the end zones of the compounding process to retain the structural integrity of the fibers. The incorporation of the long-fibers can occur in the secondary step when conducting the injection molding stage giving rise to improved properties through retention of aspect ratio and limited breakage.

Finally, blending of the nylon matrix with an additional polymer, poly(butylene terephthalate) (PBT) or poly(ethylene terephthalate) (PET), is used to provide improved thermal durability to counteract the susceptibility of nylon to oxidative degradation at elevated temperatures. These polymers are immiscible, but several studies have shown that compatibilization can be achieved using functional epoxy compatibilizers. 20, 23-25 In this invention, a unique approach is taken to compatibilize the blend using a maleated polypropylene additive, in concert with an ethylene-acrylate copolymer additive to enhance the toughness. Maleated copolymers are conventionally used in polyamide blending with aliphatic polymers, however in this case of compatibilizing nylon and PBT or PET, the use of a maleated polypropylene is novel. To the best of the authors' knowledge, the use of multiple compatibilizers, including maleated polyolefins/anhydride polyolefins, and functionalized polyoefin copolymer/terpolymer for polyamide and PBT or PET has not been reported previously.

4.3 Materials 4.3.1 Polymers
Nylon/Polyamide

Any commercially available polyamides (PA) resin may be used in the biocomposites fabrication of the present invention, including neat PA6, and PA6,6. Nylon used in this invention may also included commercially available Nylon 6 resin, from BASF Ultramid® B27E, Dupont Zytel® 7301 and Nylon 6,6 resin from BASF Ultramid® A3KUNQ601, Dupont Zytel® 101L.

Recycled Nylon/Recycled Polyamide

Recycled nylon/recycled PA6 is referring to the post-consumer use of nylon, such as from carpet industry. Recycled nylon contains minor amounts of polypropylene (4-20 wt. %) and additives. As the recycled nylon is not consistent in polymeric ratio and has unknown additives, recycled nylon is not well suited as a standalone plastic substitute to virgin or neat PA. The recycled carpet used in the examples was supplied by Competitive Green Technologies, Leamington, Canada.

Polybutylene Terephthalate

Polybutylene terephthalate (PBT) is an engineering thermoplastic polyester which may be blended with a polyamide in the present invention. The PBT may be any commercially available resin made from terephthalic acid and 1,4-butanediol through a condensation reaction. PBT used in this invention is from Celanex grade 2000-3.

Polyethylene Terephthalate

Poly(ethylene terephthalate) (PET) may be any commercially available PET. The intrinsic viscosity of the PET may be 0.7-0.9 deciliters per gram (dL/g), with a crystallinity >35%, and a melting point of approximately 220-250° C. The PET used in this invention is from DAK Americas, grade Laser+B90A, Pennsylvania, USA.

Recycled Polyethylene Terephthalate

Recycled poly(ethylene terephthalate) (rPET) may be any commercially available recycled PET flakes/pellets or obtained from regrind PET. rPET has lower molecular weight and inferior properties compared to neat PET, making rPET unsuitable in high-end applications. The rPET is food grade (food & drug administration approved for conditions of use E-G or better), and a melting point of approximately 225-250° C. The rPET used in this invention is from Phoenix Technologies food grade LNO™, Ohio, USA.

Poly (Lactic Acid)

Poly (lactic acid) (PLA) was used in this biocomposites formulation as a flow enhancer. The PLA used may be commercially available or synthesized resin made from lactic acid. The number average molecular weight of poly (lactic acid) may be in the range of 50000-450000 while polydispersity index may be in the range of 1-3. The poly (lactic acid) having the molecular weight in the range of 100000-250000 is preferred from melt viscosity considerations. The PLA used in this invention is from the injection grade PLA available from Natureworks LLC as Ingeo biopolymer 3251D. PLA in the blends and composites may constitute from about 0 to about 3% by weight. Preferably, the PLA used is injection molding grade with high melt flow index to improve the processability of the composite.

4.3.2 Additives-Compatibilizers

Additives may be used in this invention to improve the miscibility of polyamide with PBT, rPET and rPA6 as well as to improve the notched impact strength of the composites.

Maleated Polyolefins/Anhydride Polyolefins

Fusabond® P353 (maleic anhydride modified polypropylene) and Fusabond® N493 (anhydride modified ethylene copolymer) from DuPont were used as commercially available impact modifiers and compatibilizers. Compatibilizing additives may also be other commercial maleated copolymer such as maleated polyolefins (MAPP and MAPE), or multiphase compatibilizers containing both polyamide and polyolefin.

Styrene Maleic Anhydride Copolymer

Styrene Maleic Anhydride Copolymer (SMA)®17352 is a partial mono ester of SMA and a mixture of two alcohols. SMA 17352 is available in flake or powder form. SMA 17352 can be utilized to improve filler and matrix compatibility, dispersion in thermoplastic materials. The SMA used in this invention range from 1% to 5% by weight. SMA is used together with recycled carpet/recycled PET to enhanced the compatibility with nylon.

Functionalized Polyolefin Copolymer/Terpolymer

The functionalized polyolefin copolymer/terpolymer may be used as one of the glycidyl methacrylate (GMA) functionalized polyolefin copolymer and may include any of the following functional groups in various weight ratios regarding to composition: ethylene/n-butyl acrylate/glycidyl methacrylate, ethylene/methyl acrylate/glycidyil methacrylate, ethylene/glycidyl acrylate, glycidyl methacrylate-poly(ethylene octane). Any other commercially available impact modifier consists of acrylate ethylene terpolymer (EBA-GMA) can be used for the composites fabrication. An ethylene/n-butyl acrylate/glycidyl methacrylate available under trade name Elvaloy PTW manufactured by DuPont is preferred as the most efficient. The EBA-GMA content used in this invention range from 3-9% by weight.

Heat Stabilizer

Copper based heat stabilizer (antioxidants) for polyamides was used to prepare the biocomposites. The commercial heat stabilizer used in this invention is from Brugolen®H series, grade H321. The amount used may be from 1-2 phr. Further commercial additives based on copper salts may be added as heat stabilizers for the biocomposites.

4.3.3 Additives-Reinforcing Materials

Biosourced Carbon

The biocarbon used in this invention may be produced through the pyrolysis of biomass from one or more sources, such as plant fiber or agricultural residues that contain plant fiber. The pyrolysis is completed in an oxygen-limited environment at temperatures between 350 and 900° C. The different pyrolyzed biocarbon may be further modified by grinding, milling and separation to control its particle size and aspect ratio. The biocarbon used in the invention is produced from BDDC laboratories or provided by Competitive Green Technology, Leamington, Canada.

Nanoclay

The nanoclay used in this invention may be an organo-modified montmorillonite clay, modified with octadecylamine for compatibility with the polyamide matrix.

Recycled Carbon Fiber

Recycled carbon fiber may be any commercially available chopped carbon fiber obtained from post-industrial waste streams (Minifibers Inc, USA). The carbon fibers may be between 3, 6, 12 and 24 mm in length.

Long Carbon Fiber

The long carbon fiber/nylon 6 master batch process through pultrusion technique or extrusion may be used in this invention during injection moulding. The long carbon fiber/PA6 maybe in the ratios of 20/80, 30/70 and 40/60. The long carbon fiber/nylon master batch used in this invention is from PlastiComp grade Complet LCF60-PA6 1005 NAT Composite Pellets.

The blends and composites performance after incorporation of wastes and recycled resins usually results in inferior performance. This invention utilizes and convert various waste stream materials into value-added high-performance engineering plastic-based biocomposites with high recycled content. These include blends of PA6/PBT, PA6/PET, PA6/rPA6 and PA6/rPET and various combination thereof. The developed novel nylon-based biocomposite is lighter (~20%) than conventional nylon-based composite with glass fiber and talc, has high stiffness (modulus >9 GPa), has higher sustainable content (~60%) through addition of recycled engineering plastics and recycled fiber addition and is cost competitive compared to the aforementioned nylon composites. As there is normally a tradeoff in the performance with the inclusion of fillers, they are most commonly used in virgin plastics. Likewise, the addition of recycled plastic into virgin plastic tends to reduce the mechanical performance as well making it difficult to include additional fillers as further mechanical loss occurs. In this invention, the utilization of both a biofiller and recycled plastic content together is able to maintain a high-performance in properties while increasing the sustainable content above that of using only one of the constituents alone. This is attained through the mutli-functional compatibilizers which enhance the interfacial adhesion between the polyamide and recycled plastic in the matrix and in presence of the filler. This invention help maintains a cleaner environment by proper use of waste materials instead of incineration or landfilling by following a circular economy approach, with a portion of recycled content being incorporated that do not have the same degree of performance as the virgin counterparts.

4.4 Processing

Polyamide (PA6, PA6,6), recycled polyamide (rPA6), poly (lactic acid), polyester (PET), recycled polyester (rPET) and long carbon fiber master batch were dried at 80° C. for at least 12 hours prior to processing in order to remove moisture content which is undesirable for processing while biocarbon was dried at 105° C. until constant weight.

The formulations of the mentioned biocomposites and nanocomposites may be prepared via melt blending in a twin-screw extruder. This may include a semi-pilot scale continuous twin-screw extruder (DSM Xplore Micro 15 cc twin screw extruder with DSM Micro 12 cc injection molding unit), as well as a lab-scale semi-batch twin screw extruder (Leistritz co-rotating twin-screw extruder with Arburg Injection Molder), at temperatures between 240-280° C. The samples to be tested may be produced via injection moulding with melt temperatures between 250-280° C. with mould temperatures range from 30-60° C. Fiber reinforcements (rCF and LCF) were added in a late feeding zone in the extruder or in the hopper in Arburg to reduce residence time, which reduces the shearing and breakdown of the individual fibers. Maintaining the integrity of the fibers increases their reinforcing effect on the biocomposite.

4.5. Testing and Characterization

The mechanical tests i.e. tensile, flexural, Charpy impact, notched impact tests were performed according to ASTM D638 (Type IV), D790, D4812 and D256, respectively. The tensile and flexural tests were performed using an Instron model 3382 Universal Testing Machine. The tensile test was performed with a crosshead speed of 50 mm/min for neat polymers and 5 mm/min for composite samples and the flexural test were carried out at crosshead speed of 14 mm/min on 52 mm span length setup with flexural strain of 5% extension, unless early failure occurs. Notched Izod impact and Charpy impact test were carried out using a TMI 43-02 Monitor Impact Tester using 5 ft-lb Izod impact pendulum (Testing Machines Inc., New Castle, DE, USA). The samples were notched in a notch cutter according to ASTM D256 dimensions before the impact test. All the mechanical data reported were obtained from a total of 5 specimens for each sample and the mean and standard deviation were calculated.

The heat deflection temperature (HDT) measurement was carried out using dynamic mechanical analysis (DMA) Q800 from TA-Instruments, USA. The sample dimension with 50 mm×12 mm×3 mm (length×width×thickness) was setup in a 3-point bending clamp in DMA controlled force mode with an applied stress of 0.455 MPa according to ASTM D648 standard. The temperature ramp rate was 2° C./min and HIDT was determined as a temperature at which the deflection changes of samples more than 250 μm.

Melt flow index (MFI) was determined using a Qualitest 2000A melt flow indexer at 250° C. with 2.16 kg of weight, according to ASTM D1238. MFI samples were dried at 80° C. for at least 6 hours prior to MFI testing.

Density was measured using an Alfa Mirage MD-300S densimeter.

5. EXAMPLE OF THE FORMULATIONS

Examples 1-Heat Aging Performance of Different Polyamides and Engineering Polyesters

TABLE 1

Heat aged PA6, PA66, PET and PBT conditions.

| ID | Polyamide/polyester | Thermal treatment at 140° C. (hours) |
|---|---|---|
| 1 | PA6 | 0 |
| 2 | Aged PA6 | 1000 |
| 3 | PBT | 0 |
| 4 | Aged PBT | 1000 |
| 5 | PA6, 6 | 0 |
| 6 | Aged PA6, 6 | 1000 |
| 7 | PET | 0 |
| 8 | Aged PET | 1000 |

TABLE 2

Mechanical properties of conditioned PA6, PA 6,6, PET and PBT.

| ID | Tensile Modulus (GPa) | Tensile Strength (MPa) | Elongation at break, (%) | Flexural Modulus (GPa) | Flexural Strength (MPa) | Notched Impact Strength (J/m) |
|---|---|---|---|---|---|---|
| 1 | 2.78 | 83 | 50.01 | 2.96 | 116 | 52 |
| 2 | 3.46 | 28 | 1.00 | 3.62 | 41 | 17 |
| 3 | 2.51 | 54 | 117.43 | 2.59 | 94 | 37 |
| 4 | 3.04 | 66 | 4.14 | 3.10 | 107 | 13 |
| 5 | 3.53 | 87 | 22.50 | 3.08 | 120 | 44 |
| 6 | 4.32 | 14 | 0.43 | 3.46 | 20 | 14 |
| 7 | 2.54 | 60 | 161.00 | 2.63 | 95 | 32 |
| 8 | 3.11 | 81 | 4.54 | 3.33 | 134 | 17 |

Conditioned PA6, PA6,6, PET and PBT are given in Table 1 and Table 2. After thermal aging at elevated temperature for 1000 hours following ASTM D3045, the change in mechanical properties is evident for PA6, PA66, PET and PBT. It is clear that engineering polyesters PET and PBT are far superior in maintaining its tensile and flexural strength after thermal aging (Table 2) as compared to polyamide. Where most of the mechanical properties of PA6 and PA6,6 were reduced, these properties are in fact enhanced in PET and PBT. On this basis, PET and or PBT was selected as a blending component to improve the overall durability and retention of the mechanical properties in PA6 during thermal aging.

Examples 2-Mechanical Properties and Toughness Improvement for PA6/PBT Blends with Different Compatibilizers

TABLE 3

Polymer blends with multi-phase compatibilizers.

| | Polymer | | | Additives | | Heat |
|---|---|---|---|---|---|---|
| ID | PA 6 (wt. %) | PBT (wt. %) | Recycled PA 6 (wt. %) | MAPP (wt. %) | EBA-GMA (wt. %) | stabilizer (phr) |
| 9 | 90 | 10 | 0 | 0 | 0 | 0 |
| 10 | 80 | 20 | 0 | 0 | 0 | 0 |
| 11 | 85.5 | 9.5 | 0 | 0 | 5 | 0 |
| 12 | 76 | 19 | 0 | 0 | 5 | 0 |
| 13 | 59.9 | 9.5 | 25.7 | 0 | 5 | 1 |
| 14 | 53.2 | 19 | 22.8 | 0 | 5 | 1 |
| 15 | 64.1 | 9.5 | 18.8 | 2.6 | 5 | 1 |
| 16 | 57 | 19 | 16.7 | 2.3 | 5 | 1 |

*ID 9-12 were processed with DSM twin screw extruder micro-compounder.
*ID 13-16 are carried out in Leistritz twin screw extrusion followed by injection moulding.

TABLE 4

Mechanical properties of polymer blends with multi-phase compatibilizers.

| ID | Tensile Modulus (GPa) | Tensile Strength (MPa) | Elongation at break, (%) | Flexural Modulus (GPa) | Flexural Strength (MPa) | Notched Impact Strength (J/m) | Density (gm/cm$^3$) |
|---|---|---|---|---|---|---|---|
| 9 | 2.92 (0.02) | 81.7 (1.82) | 45.51 (8.29) | 3.12 (0.02) | 115.77 (0.23) | 49.15 (4.39) | 1.148 (0.005) |
| 10 | 3.04 (0.13) | 81.2 (1.61) | 83.63 (4.42) | 3.11 (0.03) | 113.52 (0.82) | 40.36 (0.86) | 1.170 (0.005) |
| 11 | 2.72 (0.19) | 67.1 (0.78) | 130.47 (18.61) | 2.48 (0.01) | 89.06 (0.49) | 104.79 (14.64) | 1.139 (0.004) |
| 12 | 2.89 (0.22) | 64.9 (0.28) | 61.03 (3.84) | 2.44 (0.02) | 85.87 (0.70) | 72.257 (3.393) | 1.151 (0.002) |
| 13 | 3.09 (0.15) | 68.1 (0.68) | 8.99 (3.73) | 2.59 (0.04) | 98.8 (0.936) | 49.88 (4.81) | 1.144 (0.004) |
| 14 | 3.06 (0.10) | 63.7 (0.84) | 6.59 (1.59) | 2.52 (0.05) | 97.4 (1.24) | 39.83 (4.04) | 1.159 (0.001) |
| 15 | 3.22 (0.47) | 62.2 (1.04) | 12.79 (1.14) | 2.61 (0.03) | 97.31 (1.14) | 59.21 (5.036) | 1.1325 (0.001) |
| 16 | 2.81 (0.14) | 64.0 (0.91) | 7.49 (1.00) | 2.78 (0.07) | 102.24 (1.57) | 47.72 (1.06) | 1.146 (0.001) |

As showed in Table 4, the binary and ternary blends of the present invention, PA6, PBT and recycled nylon, have been effectively compatibilized to produce high toughness blends that exceeds the theoretical properties expected by the rule of mixture.

Examples 3-Mechanical Properties Enhancement with Biosourced Carbon Pyrolyzed from Different Biomasses

TABLE 5

Effect of different types of biocarbon-reinforced PA6 (30/70).

| ID | Type of biocarbon | Pyrolysis Temp. (° C.) | Ball-milling (hrs) | Tensile Modulus (GPa) | Tensile Strength (MPa) | Elongation at break, (%) | Flexural Modulus (GPa) | Flexural Strength (MPa) | Notched Impact Strength (J/m) | Density (gm/cm$^3$) |
|---|---|---|---|---|---|---|---|---|---|---|
| 17 | Miscanthus | 650 | 1 | 3.97 (0.36) | 80.2 (0.92) | 15.54 (3.09) | 4.02 (0.04) | 134.11 (0.7) | 45.20 (1.13) | 1.19 (0.005) |
| 18 | Wood chips | 650 | 1 | 4.55 (0.03) | 83 (2.73) | 4.34 (0.55) | 4.11 (0.02) | 131.99 (4.516) | 26.30 (0.77) | 1.195 (0.001) |
| 19 | Wood chips | 650 | 4 | 4.26 (0.12) | 77.5 (0.72) | 13.37 (1.97) | 4.01 (0.10) | 128.93 (2.85) | 38.06 (3.63) | 1.22 (0.002) |
| 20 | Miscanthus | 900 | 1 | 5.04 (0.15) | 76.8 (2.23) | 2.23 (0.29) | 4.80 (0.10) | 130.53 (3.92) | 23.68 (2.01) | 1.214 (0.004) |
| 21 | Lignin | 900 | 1 | 4.60 (0.12) | 76.9 (0.47) | 2.36 (0.07) | 4.47 (0.04) | 120.10 (0.99) | 21.48 (1.45) | 1.239 (0.004) |
| 22 | Chicken Feather | 650 | 1 | 4.10 (0.15) | 82.2 (0.98) | 18 (1.27) | 3.96 (0.04) | 130.6 (0.85) | 37.68 (3.2) | 1.19 (0.004) |
| 23 | Wood chips | 350 | 1 | 3.29 (0.15) | 63.2 (1.81) | 2.24 (0.09) | 3.18 (0.06) | 117.21 (2.105) | 25.28 (2.37) | 1.179 (0.04) |
| 24 | Corn Cobs | 500 | 2 | 3.58 (0.08) | 75.1 (1.13) | 2.70 (0.08) | 3.51 (0.07) | 124.14 (1.07) | 26.36 (2.63) | 1.223 (0.015) |
| 25 | Soyhull BioC | 500 | 2 | 3.30 (0.10) | 60.5 (1.19) | 2.08 (0.08) | 3.33 (0.04) | 106.81 (3.08) | 23.45 (1.47) | 1.182 (0.015) |

In the example given in Table 5, the effect of biocarbon surface chemistry, source of biocarbon and pyrolysis temperature on the properties of PA 6-biocarbon biocomposites were investigated. These biocarbons are incorporated into the PA6 matrix at 30 wt. % loading to fabricate biocomposites. It was observed that the modulus was higher for biocarbon pyrolyzed at a higher temperature, while functional groups were absent in this biocarbon. The composite containing biocarbon pyrolyzed at a lower temperature revealed a higher strength and a greater affinity with the PA6.

Examples 4-Mechanical Performance of PA6 and PA66 Reinforced Biocarbon and Long Fibers

TABLE 6

Composition of biocarbon/PA6 biocomposites and biocarbon/PA6,6 biocomposites with LCFMB and LGFMB.

| | Polyamide | | | Additives | Biocarbon | | Fiber | |
|---|---|---|---|---|---|---|---|---|
| | | | Recycled | | Miscanthus | Wood | | |
| ID | PA6 (wt. %) | PA6,6 (wt. %) | PA 6 (wt. %) | MAPP (wt. %) | BC (wt. %) | BC (wt. %) | LGFMB (phr) | LCFMB (phr) |
| 26 | 80 | 0 | 0 | 0 | 0 | 20 | 0 | 0 |
| 27 | 75 | 0 | 0 | 5 | 0 | 20 | 0 | 0 |
| 28 | 80 | 0 | 0 | 0 | 20 | 0 | 5 | 0 |
| 29 | 80 | 0 | 0 | 0 | 20 | 0 | 0 | 5 |
| 30 | 80 | 0 | 0 | 0 | 0 | 20 | 5 | 0 |
| 31 | 80 | 0 | 0 | 0 | 0 | 20 | 0 | 5 |
| 32 | 80 | 0 | 0 | 0 | 0 | 20 | 2.5 | 2.5 |
| 33$ | 80 | 0 | 0 | 0 | 0 | 20 | 5 | 0 |
| 34$ | 80 | 0 | 0 | 0 | 0 | 20 | 0 | 5 |
| 35$ | 80 | 0 | 0 | 0 | 0 | 20 | 2.5 | 2.5 |
| 36 | 0 | 80 | 0 | 0 | 20 | 0 | 0 | 0 |
| 37 | 0 | 75 | 0 | 5 | 20 | 0 | 0 | 0 |
| 38 | 0 | 80 | 0 | 0 | 0 | 20 | 0 | 0 |
| 39 | 0 | 75 | 0 | 5 | 0 | 20 | 0 | 0 |
| 40 | 0 | 80 | 0 | 0 | 20 | 0 | 5 | 0 |
| 41 | 0 | 75 | 0 | 5 | 20 | 0 | 5 | 0 |
| 42 | 0 | 80 | 0 | 0 | 0 | 20 | 5 | 0 |
| 43 | 0 | 75 | 0 | 5 | 0 | 20 | 5 | 0 |
| 44 | 0 | 80 | 0 | 0 | 20 | 0 | 0 | 5 |

TABLE 6-continued

Composition of biocarbon/PA6 biocomposites and biocarbon/PA6,6 biocomposites with LCFMB and LGFMB.

| | Polyamide | | | Additives | Biocarbon | | Fiber | |
|---|---|---|---|---|---|---|---|---|
| | | | Recycled | | Miscanthus | Wood | | |
| ID | PA6 (wt. %) | PA6,6 (wt. %) | PA 6 (wt. %) | MAPP (wt. %) | BC (wt. %) | BC (wt. %) | LGFMB (phr) | LCFMB (phr) |
| 45 | 0 | 75 | 0 | 5 | 20 | 0 | 0 | 5 |
| 46 | 0 | 80 | 0 | 0 | 0 | 20 | 0 | 5 |
| 47 | 0 | 75 | 0 | 5 | 0 | 20 | 0 | 5 |
| 48 | 0 | 0 | 100 | 0 | 0 | 0 | 0 | 0 |
| 49 | 0 | 0 | 80 | 0 | 0 | 20 | 0 | 0 |
| 50 | 0 | 0 | 80 | 0 | 0 | 20 | 5 | 0 |
| 51 | 0 | 0 | 80 | 0 | 0 | 20 | 0 | 5 |

*The above compounding formulation are carried out in Leistritz twin screw extrusion followed by injection moulding.
*LGFMB—Long glass fiber/PA6 master batch
*LCFMB—Long carbon fiber/PA6 master batch
*Both Miscanthus and wood biocarbon used in the biocomposites formulations are produce with batch pyrolysis process at 650° C. and 4 hours ball-milling.
*The long carbon fibers or long glass fiber master batch were introduce during injection moulding only.
$The long carbon fibers or long glass fiber master batch were introduce during Leistritz twin screw extrusion.

TABLE 7

Effect of MAPP compatibilizer on the mechanical properties of biocarbon/PA6 biocomposites with LCFMB and LGFMB.

| ID | Tensile Modulus (GPa) | Tensile Strength (MPa) | Elongation at break, (%) | Flexural Modulus (GPa) | Flexural Strength (MPa) | Notched Impact Strength (J/m) | Density (gm/cm³) |
|---|---|---|---|---|---|---|---|
| 26 | 3.747 (0.309) | 76.8 (0.84) | 15.49 (1.69) | 3.39 (0.021) | 120.06 (1.35) | 29.60 (4.62) | 1.165 (0.003) |
| 27 | 3.764 (0.165) | 70.7 (0.53) | 9.43 (2.28) | 3.66 (0.0143) | 120.7 (0.59) | 40.11 (4.44) | 1.1513 (0.0005) |
| 28 | 4.436 (0.204) | 80.8 (0.55) | 4.94 (0.52) | 3.88 (0.0977) | 130.61 (3.42) | 38.64 (3.91) | 1.1656 (0.0005) |
| 29 | 5.677 (0.494) | 104.7 (3.88) | 3.02 (0.42) | 5.023 (0.150) | 161.98 (3.391) | 43.83 (4.529) | 1.1576 (0.0025) |

*The long carbon fibers master batch were introduce during injection moulding only.

TABLE 8

Effect of different processing techniques on the mechanical performance of biocarbon/PA6 biocomposites with LCFMB and LGFMB.

| ID | Long Fiber Master Batch (phr) | Tensile Modulus (GPa) | Tensile Strength (MPa) | Elongation at break, (%) | Flexural Modulus (GPa) | Flexural Strength (MPa) | Notched Impact Strength (J/m) | Density (gm/cm³) |
|---|---|---|---|---|---|---|---|---|
| 30 | 5 phr LGFMB | 4.08 (0.21) | 84.5 (1.31) | 8.26 (0.86) | 3.733 (0.038) | 132.67 (1.75) | 29.10 (3.86) | 1.1745 (0.0007) |
| 31 | 5 phr LCFMB | 5.99 (0.42) | 113.6 (6.82) | 3.22 (0.27) | 4.659 (0.288) | 166.47 (7.54) | 30.36 (4.16) | 1.173 (0.0014) |
| 32 | 2.5 phr LGFMB 2.5 phr LCFMB | 4.30 (0.25) | 80.40 (2.32) | 17.91 (3.62) | 3.69 (0.13) | 123.68 (4.11) | 30.01 (0.88) | 1.200 (0.003) |
| 33$ | 5 phr LGFMB | 3.79 (0.06) | 73.10 (0.31) | 25.13 (0.98) | 3.17 (0.07) | 110.31 (1.80) | 38.21 (3.42) | 1.199 (0.001) |
| 34$ | 5 phr LCFMB | 4.20 (0.10) | 78.30 (0.37) | 18.84 (0.91) | 3.47 (0.06) | 118.03 (1.79) | 34.59 (6.78) | 1.193 (0.003) |

TABLE 8-continued

Effect of different processing techniques on the mechanical performance of biocarbon/PA6 biocomposites with LCFMB and LGFMB.

| ID | Long Fiber Master Batch (phr) | Tensile Modulus (GPa) | Tensile Strength (MPa) | Elongation at break, (%) | Flexural Modulus (GPa) | Flexural Strength (MPa) | Notched Impact Strength (J/m) | Density (gm/cm³) |
|---|---|---|---|---|---|---|---|---|
| 35$ | 2.5 phr LGFMB 2.5 phr LCFMB | 3.93 (0.06) | 75.6 (0.36) | 20.19 (4.40) | 3.51 (0.10) | 117.85 (2.13) | 36.68 (4.86) | 1.202 (0.002) |

*The long carbon fibers or long glass fiber master batch were introduce during injection moulding only.
$The long carbon fibers or long glass fiber master batch were introduce during Leistritz extrusion.

The incorporation of long fiber master batch during injection moulding is more advantages (advantageous?) than addition of all the material in twin screw extruder. Moreover, long carbon fiber master batch composites showed higher mechanical properties compared to long glass fiber master batch composites as well as the hybrid of both fibers.

TABLE 9

Mechanical properties of hybrid of PA6,6/biocarbon biocomposites with LCFMB and LGFMB.

| ID | Tensile Modulus (GPa) | Tensile Strength (MPa) | Elongation at break, (%) | Flexural Modulus (GPa) | Flexural Strength (MPa) | Notched Impact Strength | Density (gm/cm³) |
|---|---|---|---|---|---|---|---|
| 36 | 4.42 (0.21) | 92.8 (1.37) | 5.19 (0.86) | 3.95 (0.02) | 146.95 (0.30) | 32.53 (0.852) | 1.181 (0.006) |
| 37 | 3.57 (0.14) | 72.6 (0.69) | 6.20 (0.63) | 3.45 (0.036) | 117.62 (0.442) | 35.18 (1.316) | 1.175 (0.001) |
| 38 | 4.34 (0.15) | 82.5 (2.51) | 2.54 (0.32) | 4.10 (0.08) | 144.35 (2.287) | 26.49 (2.67) | 1.177 (0.001) |
| 39 | 4.10 (0.17) | 70.0 (0.45) | 3.95 (0.27) | 3.56 (0.02) | 118.02 (0.63) | 35.33 (1.32) | 1.1645 (0.001) |
| 40 | 4.66 (0.16) | 90.1 (0.97) | 2.47 (0.07) | 4.10 (0.07) | 152.29 (3.30) | 32.2 (1.004) | 1.195 (0.0034) |
| 41 | 3.76 (0.12) | 79.1 (1.75) | 3.78 (0.16) | 3.57 (0.06) | 124.77 (2.15) | 36.20 (3.56) | 1.188 (0.000) |
| 42 | 4.76 (0.30) | 88.9 (2.33) | 2.75 (0.22) | 4.14 (0.05) | 149.4 (2.54) | 27.24 (3.28) | 1.184 (0.005) |
| 43 | 4.33 (0.11) | 77.6 (1.00) | 3.22 (0.20) | 3.78 (0.05) | 126.90 (2.14) | 35.01 (0.93) | 1.174 (0.001) |
| 44 | 5.55 (0.41) | 120.8 (6.96) | 3.02 (0.34) | 4.70 (0.05) | 175.06 (2.40) | 34.242 (2.611) | 1.1905 (0.0007) |
| 45 | 4.96 (0.34) | 98 (2.78) | 3.20 (0.27) | 4.03 (0.09) | 135.89 (3.46) | 36.482 (2.245) | 1.182 (0.001) |
| 46 | 5.82 (0.39) | 109.6 (5.56) | 2.68 (0.51) | 4.96 (0.10) | 177.45 (3.71) | 27.67 (5.75) | 1.181 (0.001) |
| 47 | 5.17 (0.16) | 93.8 (1.89) | 2.72 (0.33) | 4.24 (0.21) | 140.11 (4.70) | 35.82 (1.60) | 1.166 (0.001) |

*The long carbon fibers master batch were introducing during injection moulding only.

TABLE 10

Mechanical properties of PA6/recycled PA6/biocarbon-based biocomposites with LCFMB and LGFMB.

| ID | Tensile Modulus (GPa) | Tensile Strength (MPa) | Elongation at break, (%) | Flexural Modulus (GPa) | Flexural Strength (MPa) | Notched Impact Strength | Density (gm/cm³) |
|---|---|---|---|---|---|---|---|
| 48 | 3.386 (0.246) | 65.5 (0.30) | 15.88 (0.87) | 2.813 (0.025) | 104.24 (1.69) | 45.04 (2.55) | 1.166 (0.001) |
| 49 | 4.181 (0.216) | 65.8 (0.25) | 4.88 (1.02) | 3.763 (0.018) | 116.76 (0.61) | 34.55 (1.66) | 1.199 (0.002) |
| 50 | 4.810 (0.152) | 75.2 (1.55) | 3.67 (0.38) | 3.995 (0.1007) | 125.24 (3.34) | 36.61 (1.70) | 1.232 (0.004) |

TABLE 10-continued

Mechanical properties of PA6/recycled PA6/biocarbon-based biocomposites with LCFMB and LGFMB.

| ID | Tensile Modulus (GPa) | Tensile Strength (MPa) | Elongation at break, (%) | Flexural Modulus (GPa) | Flexural Strength (MPa) | Notched Impact Strength | Density (gm/cm$^3$) |
|---|---|---|---|---|---|---|---|
| 51 | 5.827 (0.458) | 92.9 (5.82) | 2.84 (0.26) | 4.64 (0.225) | 141.33 (4.399) | 41.16 (2.02) | 1.205 (0.002) |

*The long carbon fibers master batch were introduce during injection moulding only.

Examples 5-Dimensional Stability Enhancement of PA6/PA66/PBT/PET/rPET Blends Hybrid Biocomposites by Addition of Small Amount of Nanoclay

TABLE 11

Formulations for nano-enhanced biocomposites.

| | Polymer | | | | | Compatibilizer | | Fillers | | Fiber Recycled | |
|---|---|---|---|---|---|---|---|---|---|---|---|
| ID | PA6 (wt. %) | PA 6,6 (wt. %) | PBT (wt. %) | PET (wt. %) | rPET (wt. %) | MAPP (wt. %) | EBA-GMA (wt. %) | Nanoclay (wt. %) | Bio-carbon (wt. %) | Carbon Fiber (wt. %) | Heat Stabilizer (phr) |
| 52 | 100 | 0 | 0 | 0 | 0 | 0 | 0 | 0 | 0 | 0 | 0 |
| 53 | 70 | 0 | 0 | 0 | 0 | 0 | 0 | 0 | 30 | 0 | 0 |
| 54 | 70 | 0 | 0 | 0 | 0 | 0 | 0 | 1.5 | 28.5 | 0 | 0 |
| 55 | 48.0 | 0.0 | 12.0 | 0 | 0 | 3.0 | 5.0 | 0 | 19.0 | 13.0 | 0.0 |
| 56 | 45.2 | 0.0 | 11.3 | 0 | 0 | 3.0 | 7.0 | 1.5 | 23.0 | 9.0 | 0.0 |
| 57 | 44.8 | 0.0 | 11.2 | 0 | 0 | 3.0 | 7.0 | 2.0 | 23.0 | 9.0 | 0.0 |
| 58 | 44.8 | 0.0 | 11.2 | 0 | 0 | 3.0 | 7.0 | 1.5 | 24.0 | 8.0 | 0.0 |
| 59 | 44.8 | 0.0 | 11.2 | 0 | 0 | 3.0 | 7.0 | 1.5 | 24.0 | 8.0 | 1.0 |
| 60 | 44.8 | 0.0 | 11.2 | 0 | 0 | 3.0 | 7.0 | 1.5 | 25.0 | 7.0 | 1.0 |
| 61 | 36.2 | 9.0 | 11.3 | 0 | 0 | 3.0 | 7.0 | 1.5 | 25.0 | 7.0 | 1.0 |
| 62 | 40.7 | 4.5 | 11.3 | 0 | 0 | 3.0 | 7.0 | 1.5 | 26.0 | 6.0 | 1.0 |
| 63 | 40.7 | 4.5 | 11.3 | 0 | 0 | 3.0 | 7.0 | 1.5 | 27.0 | 5.0 | 1.0 |
| 64 | 41.4 | 4.6 | 11.5 | 0 | 0 | 3.0 | 6.0 | 1.5 | 26.0 | 6.0 | 1.0 |
| 65 | 41.4 | 4.6 | 0 | 11.5 | 0 | 3.0 | 6.0 | 1.5 | 26.0 | 6.0 | 1.0 |
| 66 | 41.4 | 4.6 | 0 | 0 | 11.5 | 3.0 | 6.0 | 1.5 | 26.0 | 6.0 | 1.0 |

TABLE 12

Mechanical performance and coefficient of linear thermal expansion (CLTE) of nano-enhanced biocomposite formulations.

| ID | Tensile Modulus (GPa) ASTM D 638 | Tensile Strength (MPa) ASTM D 638 | Flexural Modulus (GPa) ASTM D 790 | Flexural Strength (MPa) ASTM D 790 | Notched Impact Strength (J/m) ASTM D 256 | HDT (° C.) | CLTE (μm/m, normal direction, ASTM E831 | CLTE (μm/m, flow direction, ASTM E831 |
|---|---|---|---|---|---|---|---|---|
| 52 | 2.68 | 80.8 | 2.46 | 100.0 | 62.1 | 146.8 | 88.5 | 77.2 |
| 53 | 4.37 | 84.9 | 3.55 | 122.5 | 30.5 | 175.4 | 65.6 | 52.0 |
| 54 | 4.65 | 87.1 | 5.04 | 155.5 | 26.0 | 190.3 | 64.1 | 50.2 |

Table 12 shows the mechanical properties and coefficient of linear thermal expansion (CLTE) of the nanocomposites in this invention. Blend ID 52 shows the mechanical and thermal properties of neat PA6. In Blend 53, the addition of 30 wt. % biocarbon enhances the tensile/flexural strength and modulus, HDT, and CLTE compared to neat nylon. The hybridization of biocarbon (28.5 wt. %) and nanoclay (1.5 wt. %) in Blend 54 yields superior mechanical properties compared to Blend 53. The stiffness and flexural strength are both significantly enhanced by addition of only 1.5 wt % of nanoclay. The HDT is further improved from 175.4 to 190.3° C., and the CLTE is reduced significantly.

The key finding is that through hybridization of biocarbon and nanoclay, polyamide composites can be produced with high bio-based content (~30 wt. %), using only a very small amount of nanoclay, which possess excellent thermomechanical properties. The necessity of only a small amount of nanoclay due to hybridization with biocarbon contributes to the cost-performance efficiency of the biocomposites. A small amount of nanoclay creates nanocomposites with improved properties, while remaining cost-effective. The combination of nanoclay with biocarbon provides superior CLTE than composites with nanoclay alone.

TABLE 13

Mechanical performance of nano-enhanced polyamide blend biocomposite formulations with more than 30% sustainable and recycled content.

| ID | Tensile Modulus (MPa) | Tensile Strength (MPa) | Elongation at break, (%) | Flexural Modulus (MPa) | Flexural Strength (MPa) | Notched Impact Strength (J/m) | Density (g/cm³) | Sustainable/ recycled content (%) |
|----|----|----|----|----|----|----|----|----|
| 55 | 12462 | 122 | 2.21 | 9810 | 201 | 73.6 | 1.237 | 32.0 |
| 56 | 9684 | 92 | 1.71 | 8070 | 160 | 47.6 | 1.232 | 32.0 |
| 57 | 10271 | 89 | 1.77 | 8108 | 147 | 46.7 | 1.235 | 32.0 |
| 58 | 9959 | 89 | 2.30 | 7922 | 157 | 46.6 | 1.223 | 32.0 |
| 59 | 9234 | 84 | 2.36 | 7336 | 145 | 47.0 | 1.235 | 32.0 |
| 60 | 8161 | 82 | 1.80 | 6543 | 139 | 48.1 | 1.223 | 32.0 |
| 61 | 8946 | 89 | 2.42 | 7609 | 156 | 44.7 | 1.232 | 32.0 |
| 62 | 7540 | 86 | 2.39 | 6425 | 144 | 54.5 | 1.233 | 32.0 |
| 63 | 7128 | 80 | 2.34 | 6058 | 136 | 49.1 | 1.233 | 32.0 |
| 64 | 8312 | 89 | 2.33 | 7054 | 150 | 41.4 | 1.235 | 32.0 |
| 65 | 7288 | 87 | 2.19 | 6927 | 148 | 29.9 | 1.248 | 32.0 |
| 66 | 7856 | 88 | 1.46 | 6937 | 139 | 32.4 | 1.246 | 32.0 |

Polyamide blending with PBT is employed to preserve tensile properties during thermal aging. A maleated polypropylene (MAPP) compatibilizer in combination with EBA-GMA is used to promote miscibility as well as enhance toughness in this polymer blend. Around 3% of MAPP is used, and between 5-7% of EBA-GMA.

Blend 55 demonstrates a PA6/PBT blend in which biocarbon is hybridized with recycled carbon fiber to create a biocomposite with high bio-based content (19%) and recycled content (13%). Due to the unique compatibilization with MAPP and modification with EBA-GMA, this blend maintains an impact strength of 73.6 J/m, superior to neat PA6, while also possessing very high tensile/flexural strength and modulus with a relatively low density of 1.237 g/cm3.

Blends 56-60 demonstrate that by incorporating nanoclay as a hybrid reinforcement, a lower amount of recycled carbon fiber can be used while maintaining high mechanical properties. A tensile modulus greater than 8 GPa can be maintained while reducing the carbon fiber content to 7%. Further, 1.0 phr of a copper salt-based heat stabilizer is added to improve the thermal durability to counter the environmental aging.

Blend 61 demonstrates that by replacing 20% of the PA6 content with PA6,6, the tensile strength is increased by 7 MPa, the tensile modulus by 800 MPa, the flexural strength by 17 MPa, and the flexural modulus by 1100 MPa compared to Blend 13, while maintaining the same amount of reinforcement as used in Blend 60.

Blends 62 and 63 demonstrate a material in which the amount of recycled carbon fiber is reduced and replaced proportionally with biocarbon. This yields a material which can demonstrate tensile modulus greater than 7 GPa and flexural modulus greater than 6 GPa, while using only 5% recycled carbon fiber by weight, and containing 27% bio-based content.

Blends 65 and 66 demonstrate that the same system can be produced in which the PBT phase is replaced by PET and recycled PET, while maintaining excellent tensile and flexural strength and modulus.

Example 6-Significant Reduction in Weight/Density of the Invented Nylon-Based Biocomposites in Comparison to Conventional Nylon Composites Formulations

TABLE 14

Density comparison of Nylon 6-based biocomposite vs. conventional 40/60 glass and talc filled nylon composites.

| ID | Filler loading (wt. %) | Density (g/cm³) |
|----|----|----|
| 58 | 32.0 | 1.223 |
| 71 | 32.0 | 1.250 |
| 10% Glass Fiber 20% Talc 70% PA6 | 30.0 | 1.32-1.45 |
| 15% Glass Fiber 25% Talc 60% PA6 | 40.0 | 1.45-1.50 |

Our developed PA6/rPA6-based biocomposites showed relatively low densities (~20% reduction) as compared to the popular conventional PA6/talc/glass fiber composites. A blend of nylon/rPA6/rPET was designed with improved mechanical performance (>100 MPa tensile strength and >9000 MPa of tensile modulus, reduced density as compared to conventional 40/60 nylon composites with 15 wt. % glass fiber and 25 wt. % talc.

Example 7-Performance of High Sustainable and Recycled Plastic Content in PA6-Based Biocomposites

TABLE 15

High sustainable and recycled plastic content in PA 6-based biocomposites with hybrid fillers formulations.

PA 6 composites with hybrid fillers

| | Polymer | | | | Additives | | | | Biocarbon | | Fiber | | |
|---|---|---|---|---|---|---|---|---|---|---|---|---|---|
| | | | Recycled | | | | Fusa | | | | | | |
| ID | PA 6 (wt. %) | PBT (wt. %) | PA 6 (wt. %) | rPET (wt. %) | PLA (wt. %) | MAPP (wt. %) | EBG-MA (wt. %) | N493 (wt. %) | SMA (wt. %) | Miscanthus BC (wt. %) | Wood BC (wt. %) | rCF (wt. %) | LCFMB (phr) | HS (phr) |
| 67 | 49.5 | 12.4 | 0 | | 0 | 3 | 0 | 6 | 0 | 0 | 26 | 6 | 0 | 1 |
| 68 | 49.5 | 12.4 | 0 | | 0 | 3 | 0 | 6 | 0 | 0 | 26 | 6 | 7.5 | 1 |
| 69 | 49.5 | 12.4 | 0 | | 0 | 3 | 6 | 0 | 0 | 0 | 26 | 6 | 0 | 1 |
| 70 | 49.5 | 12.4 | 0 | | 0 | 3 | 6 | 0 | 0 | 0 | 26 | 6 | 7.5 | 1 |
| 71 | 33.6 | 0 | 14.4 | 12 | 0 | 0 | 3 | 3 | 2 | 0 | 26 | 6 | 7.5 | 1 |
| 72 | 33.6 | 0 | 14.4 | 12 | 0 | 0 | 3 | 3 | 2 | 0 | 26 Hybrid | 6 | 7.5 | 1 |
| 73 | 61 | 0 | 0 | 0 | 1 | 0 | 3 | 3 | 2 | 0 | 20 Hybrid | 0 | 10 (wt. %) | 1 |
| 74 | 24.4 | 0 | 36.6 | 0 | 1 | 0 | 3 | 3 | 2 | 0 | 20 Hybrid | 0 | 10 (wt. %) | 1 |
| 75 | 30.5 | 0 | 0 | 30.5 | 1 | 0 | 3 | 3 | 2 | 0 | 20 Hybrid | 0 | 10 (wt. %) | 1 |
| 76 | 33.6 | 0 | 14.4 | 12 | 0 | 0 | 3 | 3 | 2 | 26 | 0 | 6 | 7.5 | 1 |
| 77 | 22.4 | 0 | 41.6 | 0 | 0 | 0 | 3 | 3 | 2 | 0 | 20 Hybrid | 0 | 8 (wt. %) | 1 |
| 78 | 21.7 | 0 | 40.3 | 0 | 0 | 0 | 3 | 3 | 2 | 0 | 20 Hybrid | 4 | 6 (wt. %) | 1 |
| 79 | 33.6 | 0 | 14.4 | 12 | 0 | 0 | 3 | 3 | 2 | 0 | 26 | 6 | 7.5 | 1 |
| 80 | 33.6 | 0 | 14.4 | 12 | 1 (phr) | 0 | 3 | 3 | 2 | 0 | 26 | 6 | 7.5 | 1 |
| 81 | 33.6 | 0 | 14.4 | 12 | 1 (phr) | 0 | 3 | 3 | 2 | 26 | 0 | 6 | 7.5 | 1 |

*The above compounding formulation are carried out in Leistritz twin screw extrusion followed by injection moulding except samples no. 73, 74, 75, 76 are carried out in DSM.
*The biocarbon used are pyrolyzed from miscanthus or wood chips in the ranged from 350° C. to 900° C. with different milling time and particles size.
*Hybrid: Two different biocarbon from low and high pyrolyzed temperature.
*HS: heat stabilizers
*Recycled carbon fibers was added in the side feeder of the twin screw extruder.
*The long carbon fibers master batch were introduce during injection moulding only.

Examples 8-Effect of Long Fiber Master Batch in the PA6-Based Biocomposites

TABLE 16

Addition of long carbon fiber/PA6 (40/60) master batch during injection moulding.

| ID | Carbon Fiber Content | Tensile Modulus (MPa) ASTM D 638 | Tensile Strength (MPa) ASTM D 638 | Elongation at break, % ASTM D638 | Flexural Modulus (MPa) ASTM D 790 | Flexural Strength (MPa) ASTM D 790 | Notched Izod Impact Strength (J/m) ASTM D 256 | Notched Charpy Impact Strength (J/m) ASTM D 256 |
|---|---|---|---|---|---|---|---|---|
| 67 | 6 rCF wt % | 6644 (311.3) | 84.4 (1.51) | 2.25 (0.66) | 6653 (419.26) | 143.2 (5.55) | 38.80 (5.78) | 5.45 (1.11) |
| 68 | 6 rCF wt % + 7.5 phr LCFMB | 8177 (474.32) | 112.0 (6.08) | 1.94 (0.21) | 8223 (559.57) | 178.29 (7.36) | 49.46 (1.42) | 6.57 (0.05) |
| 69 | 6 rCF wt % | 6481 (735.5) | 75.1 (1.76) | 3.16 (0.5) | 5464 (296.7) | 125.01 (3.99) | 35.61 (2.03) | 5.17 (1.42) |
| 70 | 6 rCF wt % + 7.5 phr LCFMB | 7985 (265.91) | 98.8 (5.07) | 2.06 (0.24) | 6704 (483.74) | 149.12 (6.805) | 49.54 (2.91) | 6.34 (0.06) |

*The biocarbon used in the biocomposites contain 26 wt % of wood biocarbon pyrolyzed at 650° C.
*rCF—Recycled carbon fiber, LCFMB—Long carbon fiber master batch We incorporate long carbon fiber master batch into the different compatibilized nylon-based biocomposites to further enhance the mechanical strength of the developed biocomposites. The tensile and flexural strength increased approximately ~30%; tensile modulus and flexural modulus increased approximately ~20% with only 3% addition of long carbon fiber.

Examples 9-Effect of Hybridized Biosourced Carbon in the PA6/rPA6-Based Biocomposites Formulations

TABLE 17

Effect of hybridized biosourced carbon in the PA6/rPA6-based biocomposites formulations.

| ID | Type of Biocarbon | BioC Content and Fraction (wt. %) | Tensile Modulus (MPa) ASTM D 638 | Tensile Strength (MPa) ASTM D 638 | Elongation at break, % ASTM D638 | Flexural Modulus (MPa) ASTM D 790 | Flexural Strength (MPa) ASTM D 790 | Notched Izod Impact Strength (J/m) ASTM D 256 | Density (g/cm$^3$) | MFI (g/10 min) At 250 C. 2.16 kg |
|---|---|---|---|---|---|---|---|---|---|---|
| 71 | Biocarbon Pyrolyzed at 900° C. | 26 (100%) | 8520 (519.39) | 107.0 (6.89) | 2.16 (0.08) | 6318 (218.00) | 148.32 (2.84) | 37.11 (2.92) | 1.250 (0.001) | 11.15 (1.76) |
| 72 | Biocarbon Pyrolyzed at 900° C. and Wood Biocarbon Pyrolyzed at 650° C. | 26 (45% + 55%) | 10290 (101.32) | 102.7 (2.23) | 1.74 (0.04) | 7486 (141.57) | 145.33 (5.92) | 32.43 (1.56) | 1.249 (0.000) | 8.370 (1.75) |

* The biocarbon used in the biocomposites formulations are produce with batch pyrolysis process of wood biomass at different temperature.

The PA6/rPA6-based biocomposites reinforced with hybridized biocarbon exhibited higher tensile modulus and flexural modulus as compared to single type biocarbon reinforcement.

Example 10-Mechanical Performance of High Sustainable and Renewable Content for PAG/rPA6-Based Hybrid Biocomposites

TABLE 18

Mechanical properties of high sustainable and renewable content for PA6/rPA6-based hybrid biocomposites.

| ID | Tensile Modulus (MPa) ASTM D 638 | Tensile Strength (MPa) ASTM D 638 | Elongation at break, % ASTM D638 | Flexural Modulus (MPa) ASTM D 790 | Flexural Strength (MPa) ASTM D 790 | Notched Impact Strength (J/m) ASTM D 256 | Density (g/cm$^3$) | MFI (g/10 min) At 250 C. 2.16 Kg | Sustainable/ recycled content (%) |
|---|---|---|---|---|---|---|---|---|---|
| 71 | 8520 (519.39) | 107.0 (6.89) | 2.16 (0.08) | 6318 (218.00) | 148.32 (2.84) | 37.11 (2.92) | 1.250 (0.001) | 11.15 (1.76) | 58.4 |
| 72 | 10290 (101.32) | 102.7 (2.23) | 1.74 (0.04) | 7486 (141.57) | 145.33 (5.92) | 32.43 (1.56) | 1.249 (0.000) | 8.370 (1.75) | 58.4 |
| 73 | 9217 (539.59) | 138.8 (9.28) | 2.15 (0.20) | 7018 (1276.51) | 193.34 (21.44) | 55.15 (5.16) | 1.198 (0.008) | 15.48 (1.89) | 21.0 |
| 74 | 9183 (673.63) | 122.7 (6.19) | 1.96 (0.17) | 7158 (369.68) | 182.52 (7.56) | 45.07 (3.85) | 1.226 (0.002) | 26.07 (9.28) | 57.6 |
| 75 | 10045 (333.85) | 130.6 (5.92) | 1.65 (0.09) | 7083 (569.42) | 159.98 (9.37) | 44.67 (3.48) | 1.264 (0.003) | 8.81 (0.76) | 51.5 |
| 76 | 8680 (649.10) | 103.5 (1.50) | 2.08 (0.13) | 7188 (167.93) | 156.10 (3.14) | 37.33 (2.54) | 1.25 (0.0028) | 3.661 (0.63) | 57.4 |

TABLE 18-continued

Mechanical properties of high sustainable and renewable content for PA6/rPA6-based hybrid biocomposites.

| ID | Tensile Modulus (MPa) ASTM D 638 | Tensile Strength (MPa) ASTM D 638 | Elongation at break, % ASTM D638 | Flexural Modulus (MPa) ASTM D 790 | Flexural Strength (MPa) ASTM D 790 | Notched Impact Strength (J/m) ASTM D 256 | Density (g/cm³) | MFI (g/10 min) At 250 C. 2.16 Kg | Sustainable/ recycled content (%) |
|---|---|---|---|---|---|---|---|---|---|
| 77 | 7210 (709.33) | 106.0 (6.99) | 2.52 (0.32) | 6059 (354.98) | 163.61 (7.53) | 53.0 (5.39) | 1.21 (0.004) | 5.184 (0.52) | 61.6 |
| 78 | 8368 (637.44) | 121.3 (8.43) | 2.28 (0.12) | 7413 (299.49) | 189.70 (5.52) | 57.86 (4.14) | 1.2106 (0.004) | 4.15 (0.162) | 64.3 |

* The biocarbon used in ID 73, 74, 77, 78 is hybridization of batch pyrolyzed wood biomass at 350° C. and continuous pyrolyzed wood biomass at 650° C. respectively.
* The biocarbon used in ID 72 is hybridization of batch pyrolyzed wood biomass at 900° C. and continuous pyrolyzed wood biomass at 650° C. respectively.
*The biocarbon used in ID 76 is from continuous pyrolysis of Miscanthus biomass at 650° C.
*The biocarbon used in ID 71 is from batch pyrolysis of wood biomass at 900° C.

As shown in Table 18, the incorporation of high sustainable/recycled content (>50 wt. %) in the hybrid biocomposites formulation with the presence of the compatibilizers exhibited exceptional mechanical properties (tensile strength >100 MPa, tensile modulus ~9000 MPa, flexural modulus >7000 MPa, notched impact strength ~35-60 J/m. In particular, for ID: 75, tensile strength showed >130 MPa, tensile modulus >10 GPa, flexural modulus ~7.0 GPa and notched impact strength ~45 J/m.

Examples 11-Melt Flow Enhancement of PA6/rPA6/rPET Hybrid Biocomposites by Addition of PLA

TABLE 19

Improving the melt flow index of PA6/rPA6/rPET-based biocomposites by addition of PLA.

| ID | PLA Content (phr) | Tensile Modulus (MPa) ASTM D 638 | Tensile Strength (MPa) ASTM D 638 | Elongation at break, % ASTM D638 | Flexural Modulus (MPa) ASTM D 790 | Flexural Strength (MPa) ASTM D 790 | Notched Izod Impact Strength (J/m) ASTM D 256 | Density (g/cm³) | MFI (g/10 min) At 250 C. 2.16 Kg |
|---|---|---|---|---|---|---|---|---|---|
| 79 | 0.0 | 10995 (582.40) | 95.8 (3.32) | 1.41 (0.17) | 8355 (503.10) | 152.23 (2.19) | 31.24 (0.53) | 1.243 (0.005) | 7.904 (1.01) |
| 80 | 1.0 | 10288 (311.23) | 96.2 (3.33) | 1.67 (0.13) | 7923 (322.74) | 153.79 (2.76) | 33.90 (1.30) | 1.2515 (0.002) | 13.755 (1.71) |

* The biocarbon used in the biocomposites formulations are produce with batch pyrolysis process of wood biomass at 900° C. temperature.
*The biocomposites samples from ID79-ID80 were developed in the DSM twin screw mini compounder followed by injection moulding.

The high loading of fillers in a composites could result in poor flowability of the matrix which is undesirable for injection moulding parts. Flow enhancer usually applied for high filler loading of injection moulding parts. We found that the incorporation of PLA in the formulation aid in the flowability of the composites. The melt flow index (MFI) value of the biocomposites increase almost 2×after incorporation of low amount of PLA in the formulation.

Examples 12-Comparison of Different Biocarbon Reinforcement in PA6/rPA6/rPET Biocomposites

TABLE 20

Comparison of different biocarbon reinforcement in PA6/rPA6/rPET biocomposites.

| ID | Type of Biocarbon | BioC Content (wt. %) | Tensile Modulus (MPa) ASTM D 638 | Tensile Strength (MPa) ASTM D 638 | Elongation at break, % ASTM D638 | Flexural Modulus (MPa) ASTM D 790 | Flexural Strength (MPa) ASTM D 790 | Notched Izod Impact Strength (J/m) ASTM D 256 | Density (g/cm$^3$) | MFI (g/10 min) At 250 C. 2.16 Kg |
|----|----|----|----|----|----|----|----|----|----|----|
| 80 | Wood | 26 | 10288 (311.23) | 96.2 (3.33) | 1.67 (0.13) | 7923 (322.74) | 153.79 (2.76) | 33.90 (1.30) | 1.2515 (0.002) | 13.755 (1.71) |
| 81 | Miscanthus | 26 | 9333 (1258.7) | 88.2 (2.46) | 1.91 (0.16) | 7639 (284.53) | 140.5 (3.45) | 30.34 (1.71) | 1.2475 (0.001) | 4.324 (0.43) |

As presented in Table 20, the biosourced carbon derived from wood biomass showed higher mechanical properties as compared to the biosourced carbon derived from Miscanthus biomass.

Thus, it should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

It is to be understood that while the invention has been described in conjunction with the above embodiments, that the foregoing description and examples are intended to illustrate and not limit the scope of the invention. Other aspects, advantages and modifications within the scope of the invention will be apparent to those skilled in the art to which the invention pertains.

NON-PATENT REFERENCES

1. Tanaka, G.; Goettler, L. A., Predicting the binding energy for nylon 6,6/clay nanocomposites by molecular modeling. Polymer 2002, 43 (2), 541-553.
2. Wu, T.-M.; Liao, C.-S., Polymorphism in nylon 6/clay nanocomposites. Macromolecular Chemistry and Physics 2000, 2001 (18), 2820-2825.
3. Liu, L.; Qi, Z.; Zhu, X., Studies on nylon 6/clay nanocomposites by melt-intercalation process. Journal of Applied Polymer Science 1999, 71 (7), 1133-1138.
4. Chavarria, F.; Paul, D. R., Comparison of nanocomposites based on nylon 6 and nylon 66. Polymer 2004, 45 (25), 8501-8515.
5. Fornes, T. D.; Paul, D. R., Crystallization behavior of nylon 6 nanocomposites. Polymer 2003, 44 (14), 3945-3961.
6. Fornes, T. D.; Yoon, P. J.; Keskkula, H.; Paul, D. R., Nylon 6 nanocomposites: the effect of matrix molecular weight. Polymer 2001, 42 (25), 09929-09940.
7. Cho, J. W.; Paul, D. R., Nylon 6 nanocomposites by melt compounding. Polymer 2001, 42 (3), 1083-1094.
8. Gao, F., Clay/polymer composites: the story. Materials Today 2004, 7 (11), 50-55.
9. Auto applications drive commercialization of nanocomposites. Plastics, Additives and Compounding 2002, 4 (1), 30-33.
10. Behazin, E.; Ogunsona, E.; Rodriguez-Uribe, A.; Mohanty, A. K.; Misra, M.; Anyia, A. O., Mechanical, Chemical, and Physical Properties of Wood and Perennial Grass Biochars for Possible Composite Application. Bioresources 2015, 11 (1).
11. Behazin, E.; Misra, M.; Mohanty, A. K., Sustainable biocarbon from pyrolyzed perennial grasses and their effects on impact modified polypropylene biocomposites. Composites Part B: Engineering 2017, 118, 116-124.
12. Behazin, E.; Misra, M.; Mohanty, A. K., Sustainable biocomposites from pyrolyzed grass and toughened polypropylene: Structure-property relationships. ACS Omega 2017, 2 (5), 2191-2199.
13. Wang, T.; Rodriguez-Uribe, A.; Misra, M.; Mohanty, A. K., Sustainable carbonaceous biofiller from miscanthus: size reduction, characterization, and potential biocomposites applications. BioResources 2018, 13 (2), 3720-3739.
14. Codou, A.; Misra, M.; Mohanty, A. K., Sustainable biocarbon reinforced nylon 6/polypropylene compatibilized blends: Effect of particle size and morphology on performance of the biocomposites. Composites Part A: Applied Science and Manufacturing 2018, 112, 1-10.
15. Myllytie, P.; Misra, M.; Mohanty, A. K., Carbonized Lignin as Sustainable Filler in Biobased Poly(trimethylene terephthalate) Polymer for Injection Molding Applications. ACS Sustainable Chemistry & Engineering 2016, 4 (1), 102-110.
16. Ogunsona, E. O.; Misra, M.; Mohanty, A. K., Impact of interfacial adhesion on the microstructure and property variations of biocarbons reinforced nylon 6 biocomposites. Composites Part A: Applied Science and Manufacturing 2017, 98, 32-44.
17. Ogunsona, E. O.; Misra, M.; Mohanty, A. K., Sustainable biocomposites from biobased polyamide 6,10 and biocarbon from pyrolyzed miscanthus fibers. Journal of Applied Polymer Science 2017, 134 (4).
18. Ogunsona, E. O.; Misra, M.; Mohanty, A. K., Influence of epoxidized natural rubber on the phase structure and toughening behavior of biocarbon reinforced nylon 6 biocomposites. RSC Advances 2017, 7 (15), 8727-8739.
19. Jubinville, D.; Chang, B. P.; Pin, J.-M.; Mohanty, A. K.; Misra, M., Synergistic thermo-oxidative maleation of PA11 as compatibilization strategy for PA6 and PBT blend. Polymer 2019, 179, 121594.
20. Wakita, N., Melt elasticity of incompatible blends of poly(butylene terephthalate)(PBT) and polyamide 6 (PA6). Polymer Engineering & Science 1993, 33 (13), 781-788.
21. Han, M. S.; Lim, B. H.; Jung, H. C.; Hyun, J. C.; Kim, S. R.; Kim, W. N., Reactive blends of poly(butylene terephthalate)/polyamide-6 with ethylene glycidyl methacrylate. Korea-Aust. Rheol. J. 2001, 13 (4), 169-177.
22. Cieślak, M.; Schmidt, H., Possibilities of utilising textile floor covering wastes. 2002, 10 (2), 69-73.
23. Lievana, E.; Karger-Kocsis, J., Impact modification of PA-6 and PBT by epoxy-functionalized rubbers. Macromolecular Symposia 2003, 202 (1), 59-66.
24. Chiou, K.-C.; Chang, F.-C., Reactive compatibilization of polyamide-6 (PA 6)/polybutylene terephthalate (PBT) blends by a multifunctional epoxy resin. Journal of Polymer Science Part B: Polymer Physics 2000, 38 (1), 23-33.
25. Kim, S.-J.; Kim, D.-K.; Cho, W.-J.; Ha, C.-S., Morphology and properties of PBT/nylon 6/EVA-g-MAH ternary blends prepared by reactive extrusion. Polymer Engineering & Science 2003, 43 (6), 1298-1311.

PATENT REFERENCES

[1] China Patent CN103087515B.
[2] China Patent CN103073853B
[3] U.S. Patent Application Publication No. 2018/0022921.
[4] U.S. Pat. No. 9,809,702.
[5] U.S. Pat. No. 8,877,338.
[6] China Patent CN105086328B.
[7] China Patent CN104693606B.
[8] U.S. Pat. No. 8,541,001.

What is claimed is:

1. A biocomposite formulation comprising a polyamide, an engineering polyester, biocarbon, a maleated polypropylene (MAPP) or maleated polyethylene (MAPE) compatibilizer, and a nanofiller other than biocarbon.

2. The biocomposite formulation of claim 1, wherein the engineering polyester is polytrimethylene terephthalate (PTT), neat polyethylene terephthalate (PET), recycled PET, polybutylene terephthalate (PBT), poly (lactic acid) (PLA) or any combination thereof.

3. The biocomposite formulation of claim 1, wherein the polyamide is neat PA6, neat PA6,6, recycled polyamide, or a combination thereof.

4. The biocomposite formulation of claim 1, wherein the nanofiller is nanoclay.

5. The biocomposite formulation of claim 1, wherein the biocomposite formulation further comprises ethylene/n-butyl acrylate glycidyl methacrylate (EBA-GMA).

6. The biocomposite formulation of claim 1, wherein the biocomposite formulation comprises 1 to 3 wt. % of MAPP or MAPE.

7. The biocomposite formulation of claim 1, wherein the biocomposite formulation further comprises recycled carbon fiber.

8. The biocomposite formulation of claim 1, wherein the biocomposite formulation further comprises pultruded long carbon fiber master batch.

9. The biocomposite formulation of claim 1, wherein the biocomposite formulation has a notched impact strength equal to or more than 60 J/m.

10. The biocomposite formulation of claim 1, wherein the biocomposite formulation has tensile strength equal to or more than 100 MPa and a tensile modulus equal to or more than 9000 MPa.

11. The biocomposite formulation of claim 1, wherein the biocomposite formulation has a density equal to or more than 1.26 g/cm3.

12. The biocomposite formulation of claim 1, wherein the biocarbon is a hybrid biocarbon comprising two or more different biomass sources.

13. The biocomposite formulation of claim 1, wherein the biocarbon is a hybrid biocarbon comprising a mixture of biomass sources of different temperatures of pyrolysis.

* * * * *